United States Patent
Mödl et al.

(10) Patent No.: US 7,286,691 B1
(45) Date of Patent: Oct. 23, 2007

(54) DEVICES AND METHODS FOR BIOMETRIC AUTHENTICATION

(75) Inventors: Albert Mödl, Gersthofen (DE); Elmar Stephan, München (DE); Robert Müller, München (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/926,634

(22) PCT Filed: May 25, 2000

(86) PCT No.: PCT/EP00/04780

§ 371 (c)(1),
(2), (4) Date: Feb. 26, 2002

(87) PCT Pub. No.: WO00/74001

PCT Pub. Date: Dec. 7, 2000

(30) Foreign Application Priority Data

May 28, 1999 (DE) ................. 199 24 628

(51) Int. Cl.
*G06K 9/00* (2006.01)
*G06K 5/00* (2006.01)
*G05B 19/00* (2006.01)

(52) U.S. Cl. .................. 382/115; 340/5.2; 235/380
(58) Field of Classification Search ......... 382/115–123
See application file for complete search history.

(56) References Cited

U.S. PATENT DOCUMENTS

| | | | |
|---|---|---|---|
| 4,020,463 A * | 4/1977 | Himmel | 382/242 |
| 4,827,518 A | 5/1989 | Feustel et al. | |
| 4,993,068 A * | 2/1991 | Piosenka et al. | 713/186 |
| 5,042,073 A * | 8/1991 | Collot et al. | 382/123 |
| 5,056,147 A | 10/1991 | Turner et al. | |
| 5,457,747 A * | 10/1995 | Drexler et al. | 713/186 |
| 5,502,774 A * | 3/1996 | Bellegarda et al. | 382/159 |
| 5,581,630 A * | 12/1996 | Bonneau, Jr. | 382/116 |
| 5,719,950 A * | 2/1998 | Osten et al. | 382/115 |
| 5,815,252 A * | 9/1998 | Price-Francis | 356/71 |
| 5,869,822 A | 2/1999 | Meadows, II et al. | |
| 5,892,838 A * | 4/1999 | Brady | 382/115 |
| 5,987,155 A * | 11/1999 | Dunn et al. | 382/116 |
| 6,256,737 B1 * | 7/2001 | Bianco et al. | 713/186 |

FOREIGN PATENT DOCUMENTS

DE  197 30 170 A1  1/1999

* cited by examiner

*Primary Examiner*—Joseph Mancuso
*Assistant Examiner*—Hadi Akhavannik
(74) *Attorney, Agent, or Firm*—Bacon & Thomas, PLLC

(57) ABSTRACT

The present invention relates to devices and a method for biometric authentication by means of reference data stored in a memory of a portable data carrier.

For biometric authentication methods to make their final breakthrough with respect to more widespread use, there is a need for standardized generation of reference data for the particular biometric features used for authentication. Different suppliers of methods and devices for biometric authentication have hitherto used algorithms for generating the reference data which normally lead to different reference data which are not interchangeable. This limits the employability of biometric methods to the supplier's particular system.

The present invention avoids this problem by storing several sets of biometric reference data, thereby increasing the likelihood of the evaluation of at least one set of stored biometric reference data being possible. Thus, the desired system-independent authentication can be attained.

18 Claims, 1 Drawing Sheet

DEVICES AND METHODS FOR BIOMETRIC AUTHENTICATION

BACKGROUND

The present invention relates to devices and a method for biometric authentication by means of reference data stored in a memory of a portable data carrier.

Devices and methods for biometric authentication are known and include e.g. the evaluation of unique features such as retina, iris, speech, facial features, finger-prints, signatures with detection of the dynamics during signing, etc. Known methods for biometric authentication have been hitherto limited in their spread above all by the high prices for the sensors used for detecting the biometric features. However, new developments have made sensors available, e.g. fingerprint sensors made of semiconductor materials, which allow cost-effective realizations.

For biometric authentication methods to make their final breakthrough with respect to more widespread use, however, there is a need for standardized generation of reference data or standardization of the reference data for the particular biometric features used for authentication. Different suppliers of methods and devices for biometric authentication have hitherto used algorithms for generating the reference data which normally lead to different reference data which are not interchangeable. This limits the employability of biometric methods to the supplier's particular system.

The problem of the present invention is therefore to provide devices and a method for biometric authentication which are universally employable and not limited to a certain system.

This problem is solved by the features of the independent claims.

The invention starts out from the consideration that the storage of several sets of biometric reference data increases the likelihood of the evaluation of at least one set of stored biometric reference data being possible, so that the desired system-independent authentication is attained. This permits the desired wide spread of biometric authentication.

SUMMARY

Another embodiment of the invention involves the advantage that higher security of authentication is guaranteed by checking several of the stored sets of biometric data during authentication.

Further advantages of the invention will result from the following description of an example with reference to figures, and the dependent claims.

DETAILED DESCRIPTION OF VARIOUS EMBODIMENTS

Figure 1:
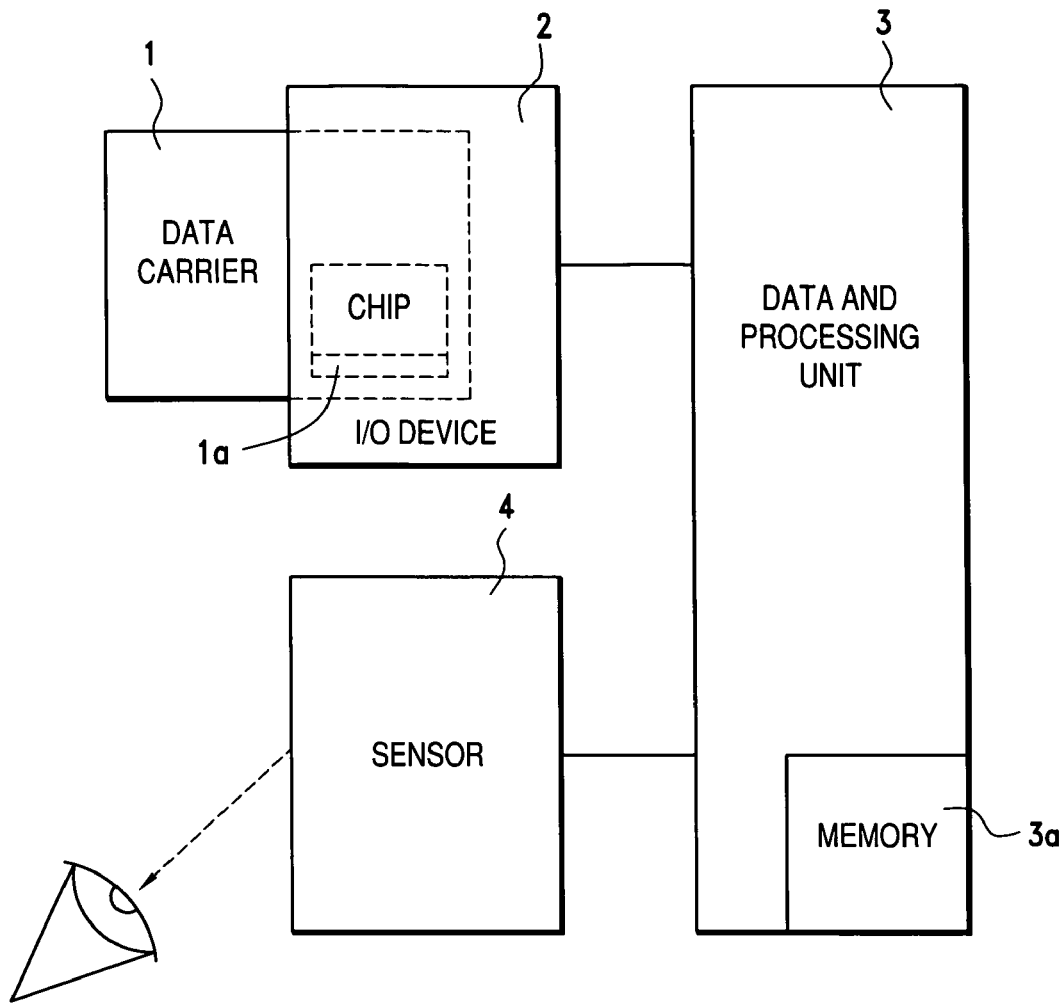
FIG. 1 shows a system for carrying out the inventive method.

The biometric authentication system shown in FIG. 1 has portable data carrier 1 introduced into input/output device 2 (I/O device) connected with control and data processing unit 3. Control and data processing unit 3 furthermore has connected thereto sensor 4 for detecting biometric features. Furthermore, control and data processing unit 3 may be provided with a keyboard, display and connection to a background data system, such as a telephone connection or network connection. The latter elements are not shown in FIG. 1 because they are not of importance for understanding the present invention. The totality of I/O device 2, data processing unit 3 and sensor 4 is usually referred to as a terminal. I/O device 2, data processing unit 3 and sensor 4 can form one structural unit.

Sensor 4 can detect for example biometric features of the eye, e.g. the iris, as shown. As described above, however, it is also possible to use sensors which detect any other biometric data. Control and data processing unit 3 can be formed for example by microcomputer 3 having in particular memory 3a with at least one non-volatile area. Data carrier 1 used can be formed for example by a smart card having chip 1a with a contact bank. Alternatively, one can use contactless smart card 1 with accordingly designed I/O device 2. Via the contact bank I/O device 2 makes a connection to the circuit components contained in chip 1a of smart card 1 which will be described in more detail below. Instead of a smart card, portable data carrier 1 can also be realized by an optical, magnetic or other suitable storage medium or a combination of storage media. In this case I/O device 2 must be formed accordingly to be able to read the stored data. To simplify the description of the biometric authentication system, however, a smart card will be assumed as portable data carrier 1 in the following by way of example.

To start up the system, smart card 1 is introduced into I/O device 2 and sensor 4 determines biometric features of the user to whom smart card 1 is to be assigned. The data of the detected biometric features are transferred by I/O device 2 to microcomputer 3 and processed there. A set of reference data is generated from the biometric features or data. The reference data are transferred by microcomputer 3 to I/O device 2, which is also suitable for writing data, and transferred from I/O device 2 to smart card 1.

For processing the biometric data and generating the set of reference data at least one corresponding algorithm, which is known in the art, is stored in memory 3a of microcomputer 3. In order to make several sets of reference data available in smart card 1, several different algorithms for generating reference data can be present in microcomputer 3. It is likewise possible for the user to perform an initialization on different terminals 2, 3, 4, comprising I/O device 2, microcomputer 3 and sensor 4, by which reference data are generated from the biometric features or data detected by sensor 4 by different algorithms. Different terminals 2, 3, 4 can be located for example with different suppliers of applications for smart card 1. Applications refers in this case to areas of use of smart card 1, such as a bank card for making payments, a door opener card for an access system, a key card for an encryption system, etc. For unique identification of the different sets of reference data or the algorithms generating them, each set of reference data can have added thereto a unique identification which designates the algorithm used for generating the set of reference data, for example in the form of a header preceding the set of reference data. The header can contain for example the name of the person who produces the algorithm used or offers it for use.

Figure 2:
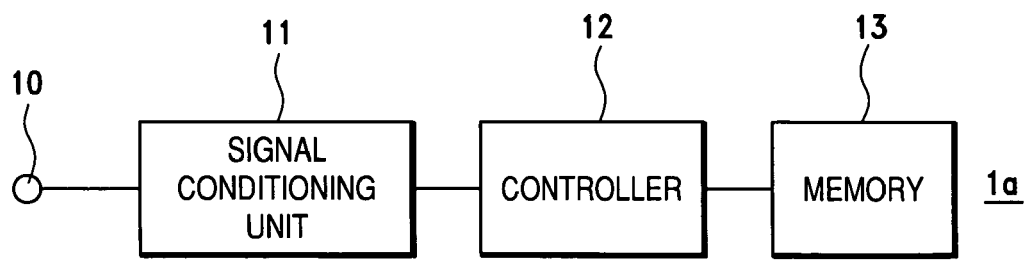
FIG. 2 shows a component of the system shown in FIG. 1.

FIG. 2 shows a more detailed view of chip 1a of smart card 1. Chip 1a has interface 10 for I/O device 2 shown in FIG. 1, which can be for example of contact-type or contactless design. Such contactless or contact-type smart cards or I/O devices are known. Interface 10 is connected with signal conditioning unit 11 which conditions the data transferred via interface 10 both for transmission and for reception. Signal conditioning unit 11 is connected with controller 12 (which can be formed by a microcomputer) to which memory 13 is connected. At least one area of memory 12 is formed as a nonvolatile memory.

As described above, the determined sets of reference data are transferred by I/O device 2 to smart card 1. They are transferred via interface 10 and signal conditioning unit 11 to microcomputer 12 which stores them in areas provided in the non-volatile part of memory 13. The different sets of reference data can be identified by means of the above-described headers which are likewise stored in the nonvolatile area of memory 13.

Upon data exchange between smart card 1 and terminal 2, 3, 4 the legitimacy of data exchange of smart card 1 and/or terminal 2, 3, 4 is usually checked. Data exchange itself can be effected in encrypted form. Methods both for encryption and for checking the legitimacy of terminal and/or smart card are known and need not be described in detail here since they are not important in connection with the present invention.

Memory 13 of smart card 1 contains after start-up several different sets of reference data for the evaluated biometric feature, for example reference data of the iris of the smart card user. When the smart card user wants to activate one of the applications of the smart card, he inserts his smart card 1 into I/O device 2 of terminal 2, 3, 4 which may be constructed like terminal 2, 3, 4 shown in FIG. 1 and has the features described above in connection with the initialization of smart card 1. The biometric features or data detected by sensor 4 of terminal 2, 3, 4 are converted by at least one algorithm stored in terminal 2, 3, 4 into at least one set of comparative data. Smart card 1 reads the sets of reference data present there in memory 13 by means of I/O device 2 and compares them with at least one set of the comparative data generated from the biometric features or data detected by sensor 2. If a match within the tolerance range of the algorithm used for comparison is ascertained between a set of reference data stored in memory 13 of smart card 1 and at least one set of comparative data generated in terminal 2, 3, 4, smart card 1 is enabled for the particular desired application.

Since the possibly necessary check of all existing sets of reference data in smart card 1 with all sets of comparative data available in terminal 2, 3, 4 is elaborate, use can be made of the above-described headers. Smart card 1 thus transfers a header together with the set of biometric reference data to indicate the algorithm used for generating the corresponding set of reference data. In terminal 2, 3, 4 the same algorithm is then used for generating the comparative data from the biometric data of the sensor. It is likewise possible that at the request of terminal 2, 3, 4 a set of reference data generated by a certain algorithm is transferred by smart card 1 to terminal 2, 3, 4. The corresponding algorithm is then also used in terminal 2, 3, 4 for generating the comparative data from the biometric data of sensor 4. To facilitate use it may be provided that identifications are added to terminal 2, 3, 4 and to smart card 1 to designate the particular existing sets of reference data and comparative data or algorithms. This makes it immediately apparent to the user whether an identified terminal can at least evaluate one set of reference data existing on his smart card.

Besides the above-described comparison of the reference data with the comparative data in microcomputer 3 of terminal 2, 3, 4, it is also possible to perform the comparison by means of microcomputer 12 of smart card 1.

To increase the security of the employed check of biometric data, it may be provided that several different sets of reference data and comparative data are used for the authentication check. That is, at least two sets of reference data and comparative data generated by different algorithms are evaluated. For this purpose the biometric data detected by sensor 4 in terminal 2, 3, 4 are converted by microcomputer 3 into different sets of comparative data by different algorithms and compared with the sets of reference data from memory 13 of smart card 1. In the process there can be a sequential check of all sets of reference data stored in memory 13 with each set of comparative data, as described above, until a match with the sets of reference data to be checked is determined. By the above-described use of headers the corresponding sets of reference data can also be directly accessed.

In a modification it is possible to decide authentication positively if for example in case of three checked sets of reference data and comparative data a match was ascertained for two sets of reference data and comparative data.

In another modification it is possible that the different sets of reference data and comparative data are generated from the data of different biometric features, e.g. iris and retina or fingerprint and iris, etc. In this case accordingly suitable sensors must be present. Additionally, different algorithms can also be applied to the different biometric data in this case.

The invention claimed is:

1. A portable data carrier capable of authentication by means of biometric data, comprising a memory in which at least two sets of biometric reference data each belonging to a different system for biometric authentication are stored, wherein the different sets of reference data are generated from biometric data of one and the same biometric feature using different algorithms, and wherein each of the sets of biometric reference data includes an identification which designates the algorithm used for generating the set of reference data.

2. A terminal for authentication by means of biometric data comprising a sensor arranged to detect a biometric feature, an I/O device for transferring data, and a control and data processing unit which is arranged to convert biometric data from the sensor which were derived from one and the same detected biometric feature into comparative data by an algorithm, wherein at least two different algorithms are used to convert said biometric data from the sensor into said comparative data, each of said different algorithms belonging to a different system for biometric authentication, said comparative data including an identification which designates the algorithm used for generating the comparative data.

3. A biometric authentication device comprising:
   a portable data carrier capable of authentication by means of biometric data comprising a memory in which at least two sets of biometric reference data are stored each belonging to a different system for biometric authentication, wherein the different sets of reference data are generated from biometric data of one and the same biometric feature using different algorithms, and wherein each of the sets of biometric reference data includes an identification which designates the algorithm used for generating the set of reference data;
   a terminal for authentication by means of biometric data comprising a sensor arranged to detect at least one biometric feature, an I/O device for transferring data, and a control and data processing unit which is arranged to convert biometric data from the sensor which were derived from one and the same detected biometric feature into comparative data by an algorithm, wherein at least two different algorithms are used to convert said biometric data from the sensor into comparative data;

wherein said reference data are transferred by the I/O device from the data carrier to the terminal, and wherein the control and data processing unit are arranged to check the reference data for a match with the comparative data.

4. The authentication device according to claim 3, wherein the comparative data are transferred by the I/O device from the terminal to the data carrier; and the data carrier includes a control and data processing unit arranged to check the reference data for a match with the comparative data.

5. The authentication device according to claim 3, wherein the portable data carrier is a smart card.

6. The authentication device according to claim 3, wherein the sets of reference data and the algorithms used for generating the sets of comparative data have a characteristic identification, and wherein reference data and comparative data with the same identification are checked.

7. The authentication device according to claim 3, wherein the detected biometric feature is selected from the group consisting of iris, retina, face, speech, fingerprints and a signature including the writing dynamics determined during signing.

8. A method for authentication by means of biometric data comprising the steps:

deriving and storing several sets of reference data from biometric data of one and the same detected biometric feature using different algorithms each belonging to a different system for biometric authentication, wherein each of the sets of biometric reference data includes an identification which designates the algorithm used for generating the set of reference data;

detecting biometric data;

converting the detected biometric data into comparative data by an algorithm; and comparing the stored reference data with the converted comparative data for an authentication.

9. The method according to claim 8, wherein the step of converting detected biometric data into comparative data is carried out by using at least two different algorithms.

10. The method according to claim 8, wherein the reference data and/or comparative data or the algorithms generating them have an identification, and only the stored reference data are compared with converted comparative data which have the same identification or only comparative data are converted from the detected biometric data by the algorithm which has the same identification.

11. The method according to claim 8, wherein the detected biometric feature is selected from the group consisting of iris, retina, face, speech, fingerprints and a signature including the writing dynamics determined during signing.

12. The method according to claim 8, wherein several different sets of reference data are derived and stored, and several different sets of comparative data have been converted from detected biometric data, and wherein the several different sets of reference data are compared with the several different sets of comparative data for authentication.

13. The method according to claim 12, wherein the different sets of reference data and the different sets of comparative data are derived and converted from biometric data of the same kind which have been converted by different algorithms.

14. The method according to claim 12, wherein the conversion of the different sets of reference data and comparative data starts out from different biometric data which have been converted by the same or by different algorithms.

15. The method according to claim 12, wherein upon comparison of several different sets of reference data with several different sets of comparative data, the authentication is decided positively if the majority of comparisons are positive.

16. A terminal according to claim 2, wherein the detected biometric feature is selected from the group consisting of iris, retina, face, speech, fingerprints and a signature including the writing dynamics determined during signing.

17. A portable data carrier according to claim 1, wherein the portable data carrier is a smart card.

18. A portable data carrier according to claim 1, wherein the detected biometric feature is selected from the group consisting of iris, retina, face, speech, fingerprints and a signature including the writing dynamics determined during signing.

* * * * *